(12) United States Patent
Ubukata et al.

(10) Patent No.: US 11,264,168 B2
(45) Date of Patent: *Mar. 1, 2022

(54) MULTILAYER CERAMIC CAPACITOR WITH INTERPOSING MOLYBDENUM (MO) GROUND LAYER

(71) Applicant: TAIYO YUDEN CO., LTD., Tokyo (JP)

(72) Inventors: Haruna Ubukata, Takasaki (JP); Satoko Namiki, Takasaki (JP); Atsuhiro Yanagisawa, Takasaki (JP); Tomonori Yamatoh, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/417,323

(22) Filed: May 20, 2019

(65) Prior Publication Data
US 2019/0371526 A1    Dec. 5, 2019

(30) Foreign Application Priority Data

Jun. 1, 2018  (JP) .............................. JP2018-106422

(51) Int. Cl.
*H01G 4/12*    (2006.01)
*H01G 4/232*   (2006.01)
*H01G 4/30*    (2006.01)

(52) U.S. Cl.
CPC ......... *H01G 4/1209* (2013.01); *H01G 4/2325* (2013.01); *H01G 4/129* (2013.01);
(Continued)

(58) Field of Classification Search
None
See application file for complete search history.

(56) References Cited

U.S. PATENT DOCUMENTS 3,034,857 A * 5/1962 Brixner ............... H01G 4/1209
                                                252/519.1
4,511,601 A * 4/1985 Akse .................. C04B 41/5127
                                                427/376.2
(Continued)

FOREIGN PATENT DOCUMENTS

EP    1560233 A1 * 8/2005 ............... H01G 4/30
EP    1583114 A1 * 10/2005 ............... H01G 4/12
(Continued)

OTHER PUBLICATIONS

Advanced ceramic components. Otitoju. 2020. Elsevier. Journal of Industrial and Engineering Chemistry 85. 34-65 (Year: 2020).*
(Continued)

*Primary Examiner* — Timothy J. Dole
*Assistant Examiner* — Muhammed Azam
(74) *Attorney, Agent, or Firm* — Law Office of Katsuhiro Arai

(57) ABSTRACT

A multilayer ceramic capacitor includes: a multilayer chip having a parallelepiped shape in which each of a plurality of dielectric layers and each of a plurality of internal electrode layers are alternately stacked and each of the internal electrode layers is alternately exposed to two end faces of the multilayer chip, a main component of the plurality of dielectric layers being a ceramic; and a pair of external electrodes that are formed on the two end faces; wherein: the pair of external electrodes have a structure in which a plated layer is formed on a ground layer; a main component of the ground layer is a metal or an alloy including at least one of Ni and Cu; and at least a part of a surface of the ground layer on a side of the plated layer includes an interposing substance including Mo.

6 Claims, 5 Drawing Sheets

(52) U.S. Cl.
CPC ......... *H01G 4/1227* (2013.01); *H01G 4/1236* (2013.01); *H01G 4/1245* (2013.01); *H01G 4/30* (2013.01)

(56) References Cited

U.S. PATENT DOCUMENTS

| | | | | |
|---|---|---|---|---|
| 4,607,314 | A * | 8/1986 | Wada | C04B 35/4682 361/321.4 |
| 4,610,968 | A * | 9/1986 | Wada | C04B 35/4682 361/320 |
| 5,036,424 | A * | 7/1991 | Yokotani | B32B 18/00 29/25.42 |
| 5,198,154 | A * | 3/1993 | Yokoyama | B22F 1/025 252/514 |
| 5,296,425 | A * | 3/1994 | Chazono | C04B 35/465 501/138 |
| 5,852,542 | A * | 12/1998 | Wada | H01G 4/1227 361/321.5 |
| 5,973,390 | A * | 10/1999 | Amaya | H01C 1/14 257/678 |
| 6,159,267 | A * | 12/2000 | Hampden-Smith | B22F 9/30 252/514 |
| 6,204,069 | B1 * | 3/2001 | Summerfelt | H01G 4/008 438/3 |
| 6,346,497 | B1 * | 2/2002 | Nakamura | C04B 35/4682 361/321.4 |
| 6,673,461 | B2 * | 1/2004 | Chazono | H01G 4/1227 428/469 |
| 6,689,186 | B1 * | 2/2004 | Hampden-Smith | B22F 9/02 75/255 |
| 7,446,997 | B2 * | 11/2008 | Kaneda | H01G 4/1227 361/306.1 |
| 7,710,712 | B2 * | 5/2010 | Takeoka | H01G 4/1227 361/321.2 |
| 7,821,770 | B2 * | 10/2010 | Nishikawa | C04B 35/4682 361/321.2 |
| 8,064,190 | B2 * | 11/2011 | Taniguchi | H01G 4/30 361/321.4 |
| 8,102,639 | B2 * | 1/2012 | Kasuya | H01G 4/1227 361/305 |
| 8,917,491 | B2 * | 12/2014 | Masuda | H01G 9/048 361/321.1 |
| 9,281,125 | B2 * | 3/2016 | Taniguchi | H01G 4/1218 |
| 9,502,181 | B2 * | 11/2016 | Suga | H01G 4/30 |
| 10,056,191 | B2 * | 8/2018 | Ryu | H01G 4/1227 |
| 10,056,192 | B2 * | 8/2018 | Taniguchi | H01G 4/1218 |
| 10,290,424 | B2 * | 5/2019 | Yanagisawa | H01G 4/2325 |
| 10,381,156 | B2 * | 8/2019 | Nishikawa | C04B 35/4682 |
| 10,431,383 | B2 * | 10/2019 | Morita | H01G 4/012 |
| 10,431,384 | B2 * | 10/2019 | Morita | H01G 4/2325 |
| 10,515,764 | B2 * | 12/2019 | Mizuno | H01G 4/0085 |
| 10,672,558 | B2 * | 6/2020 | Morita | H01G 4/232 |
| 10,672,559 | B2 * | 6/2020 | Inomata | H01G 4/012 |
| 10,886,065 | B2 * | 1/2021 | Mori | H01G 4/12 |
| 2002/0039272 | A1 * | 4/2002 | Mizuno | H01G 4/232 361/311 |
| 2003/0175411 | A1 * | 9/2003 | Kodas | H01G 4/1227 427/58 |
| 2004/0126484 | A1 * | 7/2004 | Croswell | H01G 4/12 427/79 |
| 2004/0144205 | A1 | 7/2004 | Matsuno et al. | |
| 2004/0145856 | A1 * | 7/2004 | Nakamura | H01G 4/30 361/311 |
| 2004/0176239 | A1 * | 9/2004 | Nakamura | H01G 4/1227 501/138 |
| 2005/0117274 | A1 * | 6/2005 | Miyauchi | H01G 4/12 361/321.2 |
| 2005/0152095 | A1 * | 7/2005 | Nakano | H01G 4/1227 361/321.4 |
| 2005/0254197 | A1 * | 11/2005 | Murasawa | H01G 4/30 361/321.2 |
| 2009/0002920 | A1 | 1/2009 | Itamura et al. | |
| 2009/0168299 | A1 | 7/2009 | Thomas | |
| 2009/0225494 | A1 * | 9/2009 | Yamazaki | C04B 35/4682 361/321.4 |
| 2009/0310279 | A1 * | 12/2009 | Sasabayashi | C04B 35/4682 361/321.4 |
| 2009/0323253 | A1 * | 12/2009 | Kobayashi | H01G 4/232 361/301.4 |
| 2011/0019333 | A1 * | 1/2011 | Yao | C04B 35/4682 361/301.4 |
| 2011/0235235 | A1 * | 9/2011 | Yao | C04B 35/4682 361/321.4 |
| 2012/0287553 | A1 * | 11/2012 | Ramani | H01G 4/33 361/301.4 |
| 2013/0020905 | A1 * | 1/2013 | Sawada | H01G 4/012 310/311 |
| 2013/0107419 | A1 * | 5/2013 | Hill | H01G 4/008 361/305 |
| 2013/0222968 | A1 * | 8/2013 | Koga | C04B 35/62818 361/301.4 |
| 2013/0299215 | A1 * | 11/2013 | Taseda | H01G 4/248 174/255 |
| 2013/0309591 | A1 * | 11/2013 | Huang | C04B 35/14 429/452 |
| 2014/0009864 | A1 * | 1/2014 | Takashima | C04B 35/4682 361/301.4 |
| 2014/0029159 | A1 * | 1/2014 | Shimada | H01G 4/30 361/303 |
| 2015/0055273 | A1 | 2/2015 | Endo et al. | |
| 2015/0062775 | A1 | 3/2015 | Shibasaki et al. | |
| 2015/0287535 | A1 | 10/2015 | Nakanishi et al. | |
| 2016/0042868 | A1 * | 2/2016 | Otsuka | H01G 4/30 361/301.4 |
| 2016/0086733 | A1 * | 3/2016 | Saito | H01G 4/1227 361/301.4 |
| 2016/0172109 | A1 * | 6/2016 | Kobayashi | H01G 4/012 361/301.4 |
| 2016/0189865 | A1 * | 6/2016 | Kawamura | H01G 4/1227 361/301.4 |
| 2016/0189867 | A1 * | 6/2016 | Zaima | H01G 4/232 361/301.4 |
| 2016/0189868 | A1 * | 6/2016 | Sasaki | H01G 4/012 361/301.4 |
| 2016/0217924 | A1 * | 7/2016 | Morita | C04B 35/4682 |
| 2016/0254094 | A1 * | 9/2016 | Lee | H01G 4/30 361/301.4 |
| 2016/0284471 | A1 | 9/2016 | Mizuno et al. | |
| 2017/0032894 | A1 * | 2/2017 | Kawamura | H01G 4/1227 |
| 2017/0032895 | A1 | 2/2017 | Ogata et al. | |
| 2017/0032897 | A1 * | 2/2017 | Sasaki | H01G 4/0085 |
| 2017/0345564 | A1 * | 11/2017 | Ryu | H01G 4/005 |
| 2017/0345566 | A1 * | 11/2017 | Tanaka | H01G 4/1209 |
| 2017/0345570 | A1 * | 11/2017 | Sakatsume | H01G 4/2325 |
| 2017/0372841 | A1 * | 12/2017 | Kawamura | C04B 35/62685 |
| 2018/0061576 | A1 | 3/2018 | Nakamura et al. | |
| 2018/0068790 | A1 | 3/2018 | Chigira | |
| 2018/0068797 | A1 * | 3/2018 | Chigira | H01G 4/30 |
| 2018/0139826 | A1 * | 5/2018 | Cho | H01G 4/33 |
| 2018/0162780 | A1 * | 6/2018 | Kaneda | B32B 15/00 |
| 2018/0174752 | A1 | 6/2018 | Yanagisawa et al. | |
| 2018/0182552 | A1 * | 6/2018 | Sawada | H01G 4/12 |
| 2018/0233284 | A1 | 8/2018 | Taniguchi | |
| 2019/0027311 | A1 * | 1/2019 | Chigira | H01G 4/30 |
| 2019/0096577 | A1 * | 3/2019 | Uenishi | H01G 4/12 |
| 2019/0148070 | A1 * | 5/2019 | Kobayashi | H05K 1/111 174/260 |
| 2019/0237262 | A1 | 8/2019 | Nagaoka et al. | |
| 2019/0244758 | A1 * | 8/2019 | Oshima | H01G 4/1245 |
| 2019/0272954 | A1 * | 9/2019 | Ariga | H01G 4/008 |
| 2019/0355517 | A1 | 11/2019 | Chigira | |
| 2019/0355520 | A1 * | 11/2019 | Nakamura | H01G 4/30 |
| 2019/0362895 | A1 * | 11/2019 | Kobayashi | H01G 4/2325 |
| 2019/0371525 | A1 * | 12/2019 | Zaima | H01G 4/012 |
| 2019/0371526 | A1 * | 12/2019 | Ubukata | H01G 4/232 |
| 2019/0378655 | A1 * | 12/2019 | Iwai | H01G 4/012 |
| 2019/0385794 | A1 * | 12/2019 | Yanagisawa | H01G 4/1245 |

(56) References Cited

U.S. PATENT DOCUMENTS

FOREIGN PATENT DOCUMENTS

| JP | H0180011 A | 3/1989 |
| JP | 2001015376 A | 1/2001 |
| JP | 2004228094 | 3/2007 |
| JP | 2016066783 A | 4/2016 |
| TW | 201133525 A | 10/2011 |
| TW | 201237899 A | 9/2012 |
| TW | 201633339 A | 9/2016 |
| WO | WO-02085811 A1 * 10/2002 ........... H01G 4/0085 |

OTHER PUBLICATIONS

Notice of Reasons for Refusal issued by the Japanese Patent Office, dated Jan. 26, 2021, for Japanese related application No. 2016-248519. (3 pages).

Notice of Allowance issued by U.S Patent and Trademark Office, dated Jan. 25, 2021, for relevant U.S. Appl. No. 16/434,003 (19 pages).

A Notice of Reasons for Refusal issued by the Japanese Patent Office, dated Oct. 6, 2020, for Japanese related application No. 2016-248519. (3 pages).

A Notification of the Opinion after the Examination with Search Report issued by Taiwan Intellectual Property Office, dated Sep. 15, 2020, for Taiwan related application No. 106143315. (8 pages).

Non-Final Office Action issued by U.S. Patent and Trademark Office, dated Jul. 24, 2020, for relevant U.S. Appl. No. 16/434,003 (24 pages).

Non-Final Office Action issued by U.S. Patent and Trademark Office, dated Jun. 15, 2018, for relevant U.S. Appl. No. 15/836,657, now U.S. Pat. No. 10,290,424. (18 pages).

Notification of Reason for Refusal issued by Korean Intellectual Property Office, dated Aug. 3, 2021, for Korean counterpart application No. 1020170171077 (4 pages).

A First Office Action issued by the State Intellectual Property Office of China dated Aug. 4, 2021 for Chinese counterpart application No. 201910461518.8 (6 pages).

* cited by examiner

MULTILAYER CERAMIC CAPACITOR WITH INTERPOSING MOLYBDENUM (MO) GROUND LAYER

CROSS-REFERENCE TO RELATED APPLICATION

This application is based upon and claims the benefit of priority of the prior Japanese Patent Application No. 2018-106422, filed on Jun. 1, 2018, the entire contents of which are incorporated herein by reference.

FIELD

A certain aspect of the present invention relates to a multilayer ceramic capacitor.

BACKGROUND

A multilayer ceramic capacitor has a multilayer structure in which a plurality of dielectric layers and a plurality of internal electrode layers are alternately stacked, and a pair of external electrodes that are formed on end faces of the multilayer structure and are electrically coupled to the internal electrode layers extracted to the end faces. The external electrode has a structure in which a ground layer is subjected to a plating. Japanese Patent Application Publication No. H01-80011 discloses that hydrogen generated in the plating is adsorbed in the internal electrode layer and an insulating resistance of the dielectric layer is degraded by reduction caused by the hydrogen. And the patent document discloses that Ni (nickel) is added as a metal for suppressing hydrogen adsorption to the internal electrode of which a main component is a noble metal. On the other hand, Japanese Patent Application Publication No. 2016-66783 discloses the insulating resistance is degraded because of influence of hydrogen even if Ni is used for the internal electrode layer.

SUMMARY OF THE INVENTION

It is demanded that hydrogen intrusion from the external electrode acting as an intrusion path of the hydrogen is suppressed, in order to suppress the influence of hydrogen.

The present invention has a purpose of providing a multilayer ceramic capacitor that is capable of suppressing hydrogen intrusion from an external electrode.

According to an aspect of the present invention, there is provided a multilayer ceramic capacitor including: a multilayer chip having a parallelepiped shape in which each of a plurality of dielectric layers and each of a plurality of internal electrode layers are alternately stacked and each of the internal electrode layers is alternately exposed to two end faces of the multilayer chip, a main component of the plurality of dielectric layers being a ceramic; and a pair of external electrodes that are formed on the two end faces; wherein: the pair of external electrodes have a structure in which a plated layer is formed on a ground layer; a main component of the ground layer is a metal or an alloy including at least one of Ni and Cu; and at least a part of a surface of the ground layer on a side of the plated layer includes an interposing substance including Mo.

DETAILED DESCRIPTION

A description will be given of an embodiment with reference to the accompanying drawings.

Embodiment

Figure 1:
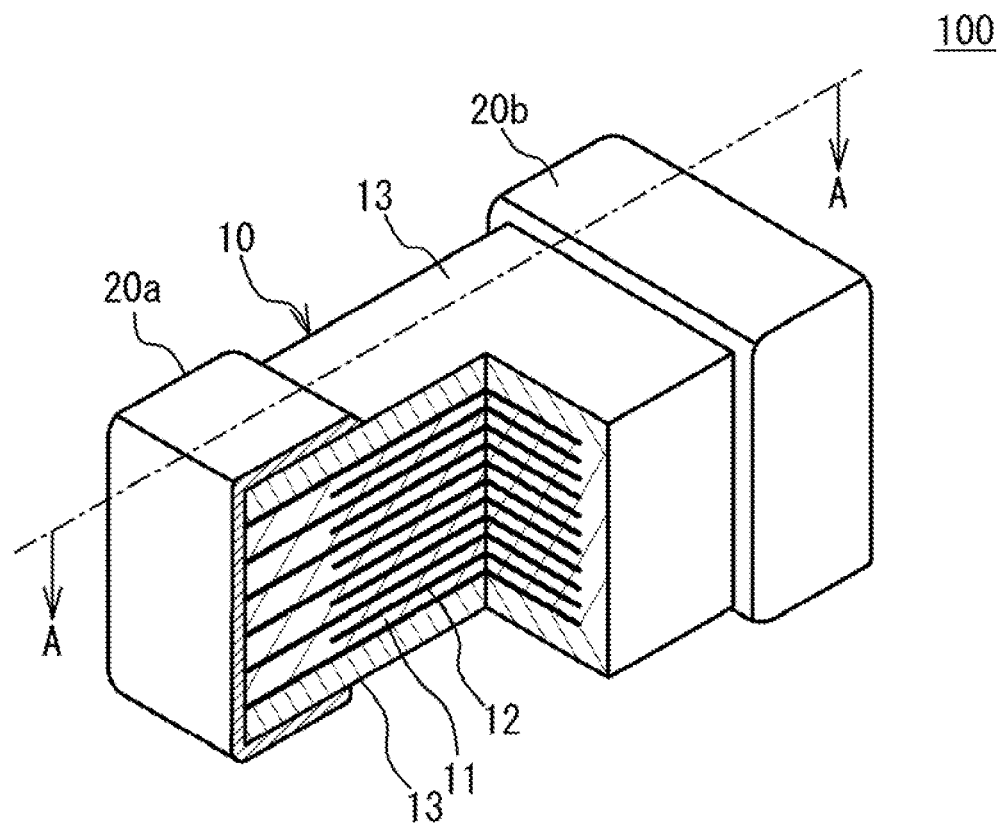
FIG. 1 illustrates a partial perspective view of a multilayer ceramic capacitor.

A description will be given of a multilayer ceramic capacitor. FIG. 1 illustrates a partial perspective view of a multilayer ceramic capacitor 100. As illustrated in FIG. 1, the multilayer ceramic capacitor 100 includes a multilayer chip 10 having a rectangular parallelepiped shape, and a pair of external electrodes 20a and 20b that are respectively provided at two end faces of the multilayer chip 10 facing each other. Four faces of the multilayer chip 10 other than the two end faces are referred to as side faces. The external electrodes 20a and 20b extend to the four side faces. However, the external electrodes 20a and 20b are spaced from each other on the four side faces.

The multilayer chip 10 has a structure designed to have dielectric layers 11 and internal electrode layers 12 alternately stacked. The dielectric layer 11 includes ceramic material acting as a dielectric material. The internal electrode layer 12 includes a base metal material. End edges of the internal electrode layers 12 are alternately exposed to a first end face of the multilayer chip 10 and a second end face of the multilayer chip 10 that is different from the first end face. In the embodiment, the first face faces with the second face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, an upper face and a lower face in the stack direction of the dielectric layers 11 and the internal electrode layers 12 (hereinafter referred to as stack direction) are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of noble metal such as platinum (Pt), palladium (Pd), silver (Ag), gold (Au) or alloy thereof. For example, the dielectric layers 11 are mainly composed of a ceramic material having a perovskite structure expressed by a general formula $ABO_3$. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure.

Figure 2:
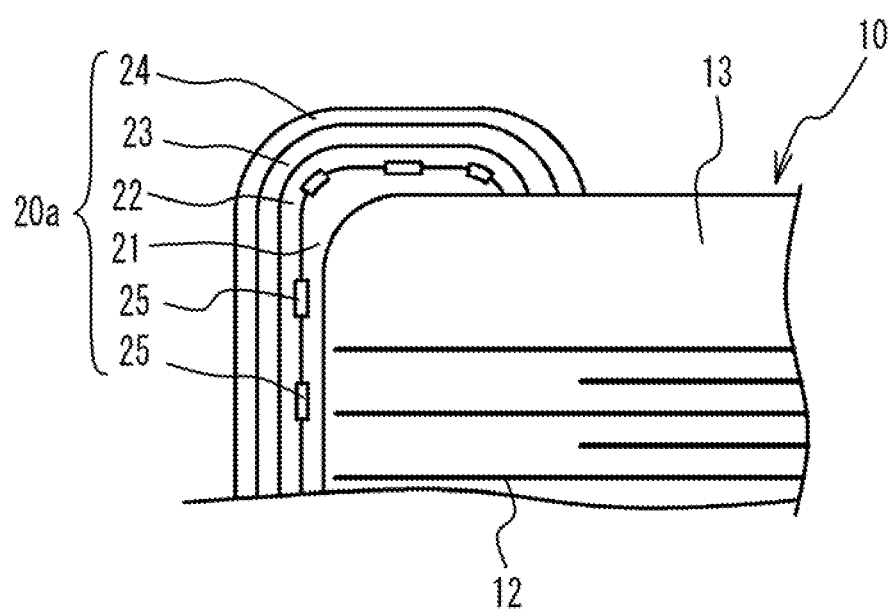
FIG. 2 illustrates a cross sectional view taken along a line A-A of FIG. 1.

FIG. 2 illustrates a cross sectional view of the external electrode 20a and is a cross sectional view taken along a line A-A of FIG. 1. In FIG. 2, hatching for cross section is omitted. As illustrated in FIG. 2, the external electrode 20a has a structure in which a Cu-plated layer 22, a Ni-plated layer 23 and a Sn-plated layer 24 are formed on a ground layer 21 in this order. The ground layer 21, the Cu-plated layer 22, the Ni-plated layer 23 and the Sn-plated layer 24 extend toward the four side faces of the multilayer chip 10 from the both end faces of the multilayer chip 10. In FIG. 2, the external electrode 20a is illustrated. However, the external electrode 20b has the same structure as the external electrode 20a.

A main component of the ground layer 21 is a metal or an alloy including at least one of Ni and Cu. The ground layer 21 may include a glass component for densifying the ground layer 21 or a co-material for controlling sinterability of the ground layer 21. The glass component is an oxide such as Ba, Sr, Ca, Zn (zinc), Al (aluminum), Si (silicon), B (boron) or the like. The co-material is a ceramic component. For example, the co-material is a ceramic component that is a main component of the dielectric layer 11.

An interposing substance 25 including Mo (molybdenum) is formed on a surface of the ground layer 21 on the plated layer side. When the Cu-plated layer 22, the Ni-plated layer 23 and the Sn-plated layer 24 are formed, hydrogen is generated. However, when the interposing substance 25 including Mo is formed on the surface of the ground layer 21, intrusion of the hydrogen into the ground layer 21 and the internal electrode layer 12 is suppressed. For example, Mo has a function of preventing hydrogen permeation. It is thought that an intrusion path of the hydrogen is blocked (blocking effect is achieved), because the interposing substance 25 including Mo preventing the hydrogen permeation is provided on the surface of the ground layer 21, and permeability of the hydrogen in the external electrodes 20a and 20b is reduced. When the intrusion path of hydrogen is blocked, adsorption of the hydrogen into the ground layer 21 and the internal electrode layer 12 is suppressed and reduction of the dielectric layer 11 is suppressed. Thus, the decrease of the insulating resistance of the multilayer ceramic capacitor 100 is suppressed. In the plating process of the Cu-plated layer 22 and the Ni-plated layer 23, a lot of hydrogen is generated at a surface subjected to the plating. Therefore, it is specifically effective to block the intrusion path of hydrogen.

A shape of the interposing substance 25 is not limited. For example, the interposing substance 25 may have a layer shape so as to cover the surface of the ground layer 21. Alternatively, the interposing substance 25 may have islands shape on the surface of the ground layer 21. A main component of the interposing substance 25 is a compound of Mo. The Mo compound acting as the main component of the interposing substance 25 is such as molybdenum oxide ($MoO_2$, $MoO_3$ and so on).

In the embodiment, Mo is focused on as an element existing on the surface of the ground layer 21. However, the structure is not limited. Another element that has a function preventing the hydrogen permeation may be used instead of Mo.

When a main component of the internal electrode layer 12 is Ni, the hydrogen adsorption of the internal electrode layer 12 is enhanced. Therefore, when the main component of the internal electrode layer 12 is Ni, it is specifically effective to suppress the hydrogen intrusion from the external electrodes 20a and 20b. In the plating process of the Cu-plated layer 22 and the Ni-plated layer 23, a lot of hydrogen is generated at the surface subjected to the plating process. Therefore, it is specifically effective to block the intrusion path of hydrogen.

Sn has high compactness. This is because Sn has a closest packing structure. When the Sn-plated layer 24 is formed on the ground layer 21, hydrogen is confined on the multilayer chip 10 side with respect to the Sn-plated layer 24. That is, influence of the hydrogen tends to occur. Therefore, when the Sn-plated layer 24 is formed on the ground layer 21, it is specifically effective to suppress intrusion of hydrogen from the external electrodes 20a and 20b.

Figure 3:
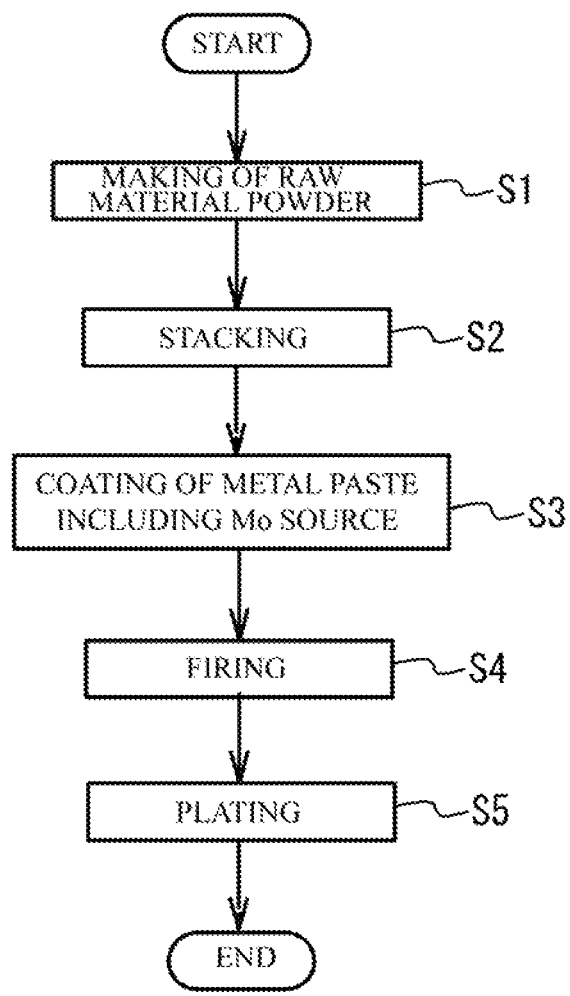
FIG. 3 illustrates a flowchart of a manufacturing method of a multilayer ceramic capacitor.

Next, a description will be given of a manufacturing method of the multilayer ceramic capacitor 100. FIG. 3 illustrates a manufacturing method of the multilayer ceramic capacitor 100.

[Making Process of Raw Material Powder]

Additive compound may be added to ceramic powder that is a main component of the dielectric layer 11, in accordance with purposes. The additive compound may be an oxide of Mg (magnesium), Mn (manganese), V (vanadium), Cr (chromium) or a rare earth element (Y (yttrium), Sm (samarium), Eu (europium), Gd (gadolinium), Tb (terbium), Dy (dysprosium), Ho (holmium), Er (erbium), Tm (thulium) and Yb (ytterbium), or an oxide of Co (cobalt), Ni, Li (lithium), B, Na (sodium), K (potassium) and Si, or glass. For example, compound including additive compound is added to ceramic material powder and is calcined. Next, the resulting ceramic material grains are wet-blended with additive compound, is dried and is crushed. Thus, the ceramic material powder is adjusted.

[Stacking Process]

Next, a binder such as polyvinyl butyral (PVB) resin, an organic solvent such as ethanol or toluene, and a plasticizer are added to the resulting ceramic powder and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming the internal electrode with use of screen printing or gravure printing. The conductive paste includes powder of the main component metal of the internal electrode layer 12, a binder, a solvent, and additives as needed. It is preferable that the binder and the solvent are different from those of the above-mentioned ceramic slurry. As a co-material, the ceramic material that is the main component of the dielectric layer 11 may be distributed in the conductive paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of external electrodes of different polarizations. Cover sheets, which are to be the cover layers 13, are compressed on the stacked green sheets and under the stacked sheets. The resulting compact is cut into a predetermined size (for example, 1.0 mm×0.5 mm). Thus, a ceramic multilayer structure having a rectangular parallelepiped shape is obtained.

[Coating Process of a Metal Paste]

Next, the binder is removed from the ceramic multilayer structure made in the stacking process in $N_2$ atmosphere in a temperature range of 200 degrees C. to 500 degrees C. After that, a metal paste including a metal filler, the co-material, the binder, the solvent and a Mo source is coated from the both end faces of the ceramic multilayer structure to each side face and is dried. The metal paste is used for forming the external electrodes. In this case, it is preferable that the metal paste is coated and is dried so that a concentration of the Mo source is higher on the surface side. For example, two types of the metal paste that are used for forming the external electrodes and have a different concentration of the Mo source may be prepared, and the concentration of the Mo source on the end faces of the ceramic multilayer structure may be lower, and the concentration of the Mo source on the surface side may be higher.

A type, a shape or the like of the Mo source is not limited. For example, in concrete, molybdenum oxide ($MoO_2$, $MoO_3$), molybdenum chloride ($MoCl_2$, $MoCl_3$, $MoCl_4$), molybdenum hydroxide ($Mo(OH)_3$, $Mo(OH)_5$), barium molybdate ($BaMoO_4$), ammonium molybdate (($NH_4)_6Mo_7O_{24} \cdot 4H_2O$), molybdenum-nickel alloy, or the like may be used as the Mo source. A co-material in which Mo is dissolved in advance may be used as the Mo source.

[Firing Process]

Next, the resulting ceramic multilayer structure on which the metal paste for forming the external electrode is fired for ten minutes to 2 hours in a reductive atmosphere in a temperature range of 1100 degrees C. to 1300 degrees C. In this manner, a sintered structure having the multilayer chip 10 having the multilayer structure in which the sintered dielectric layers 11 and the sintered internal electrode layers 12 are alternately stacked and having the cover layers 13 formed as outermost layers of the multilayer chip 10 in the stack direction and the ground layer 11 is obtained.

[Plating Process]

After that, a plating process is performed. Thereby, the Cu-plated layer 22, the Ni-plated layer 23 and the Sn-plated layer 24 are formed on the ground layer 21 in this order. With the processes, the multilayer ceramic capacitor 100 is fabricated.

Figure 4A:
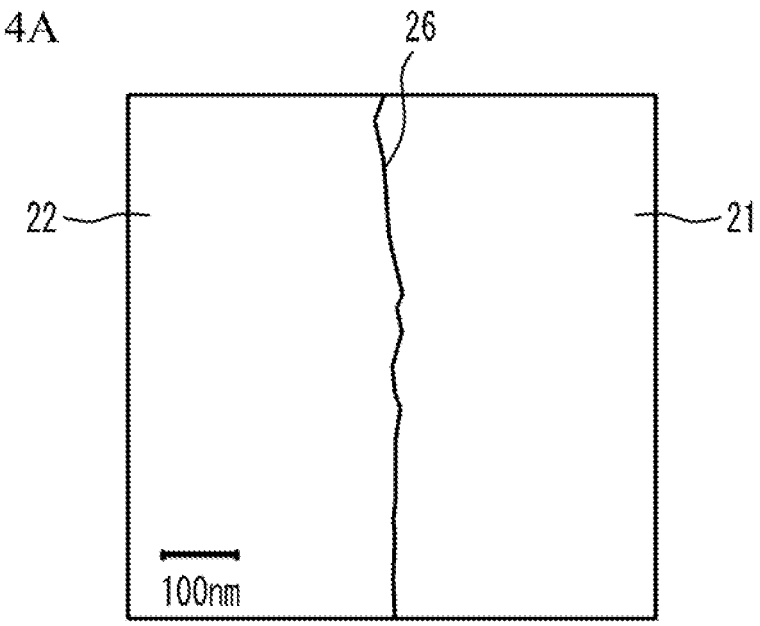
FIG. 4A illustrates a ground layer and a Cu-plated layer that are observed with use of a STEM.

FIG. 4A illustrates the ground layer 21 and the Cu-plated layer 22 that are observed with use of a STEM (Scanning Transmission Electron Microscope). As illustrated in FIG. 4A, an interface 26 appears between the ground layer 21 and the Cu-plated layer 22.

Figure 4B:
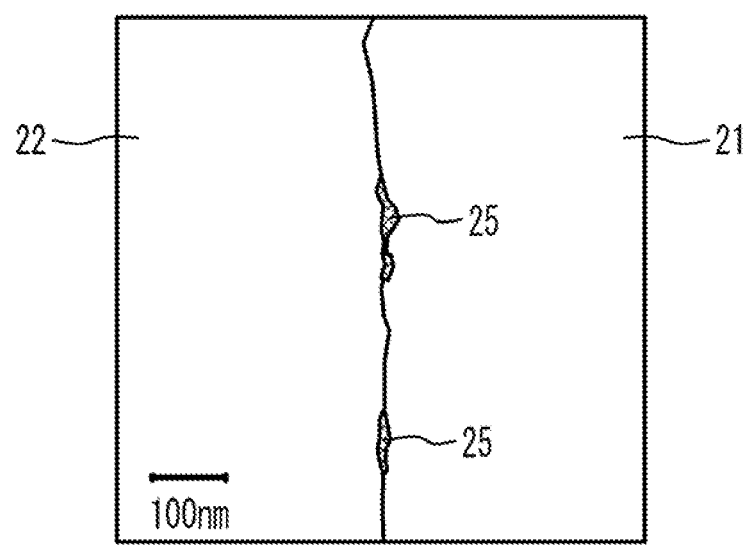
FIG. 4B illustrates distribution of Mo in a ground layer and a Cu-plated layer that is measured with use of a STEM-EDS.

FIG. 4B illustrates distribution of Mo in the ground layer 21 and the Cu-plated layer 22 that is measured with use of a STEM-EDS (Energy-Dispersive-Spectroscopy). A measured region of FIG. 4B is the same as that of FIG. 4A. In the example of FIG. 4B, a meshed region in a center portion is a region in which the concentration of Mo is relatively high and corresponds to the interposing substance 25. In the example of FIG. 4B, a region that is not meshed is a region in which Mo is not detected. From the results of FIG. 4A and FIG. 4B, it is confirmed that the interposing substance 25 including Mo is formed on the surface of the ground layer 21 on the side of the plated layers.

When FIG. 4A is compared with FIG. 4B, it is confirmed that Mo locally exists. From the result, it is understood that Ni or Cu, and Mo are not dissolved in each other, and do not form an intermetallic compound, and are independently distributed. It is therefore understood that Mo exists as a single Mo having a very small hydrogen permeability coefficient. Accordingly, it is demonstrated that an intrusion path of hydrogen from the external electrode 20a and 20b is blocked (blocking effect is achieved). It is thought that the reason that Mo locally exists is the firing of the metal paste including the Mo source is performed at a temperature higher than the melting point of the Mo source and the melted Mo source is precipitated on the surface of the ground layer 21.

Figure 5A:
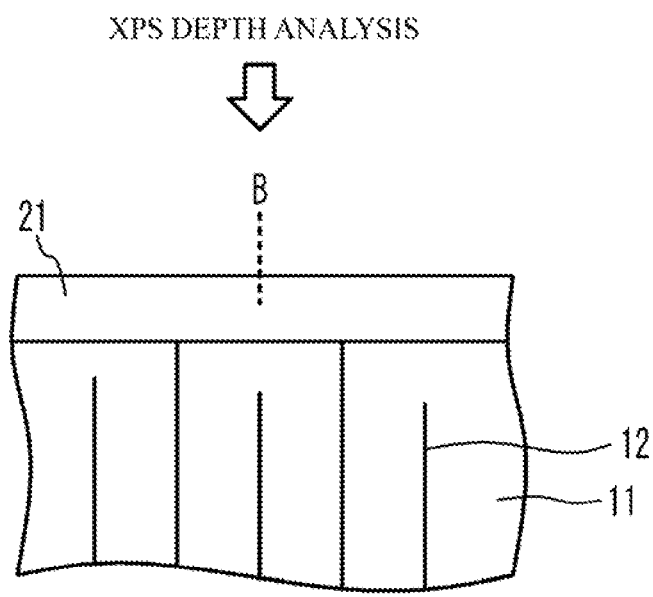
FIG. 5A illustrates measured points.
Figure 5B:
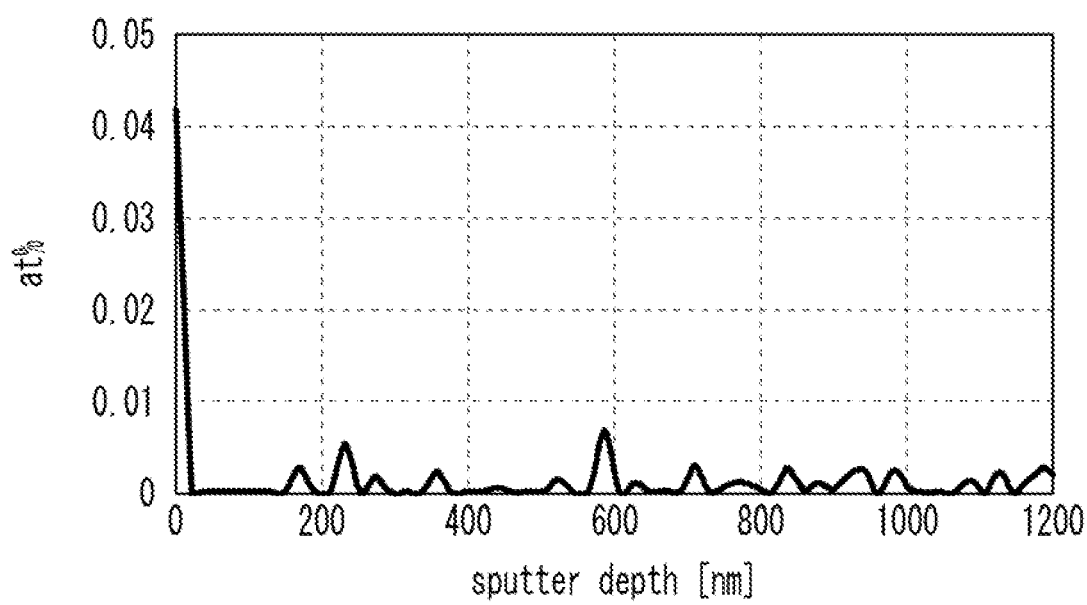
FIG. 5B illustrates measured results of a Mo concentration at a cross section taken along a B line.

Next, a description will be given of a measured result of the Mo concentration in a depth direction from the surface of the ground layer 21 to the dielectric layer 11, with use of XPS (X-ray Photoelectron Spectroscopy) and Ar (argon) sputtering. FIG. 5A illustrates a measured point. As illustrated in FIG. 5A, the Mo concentration with respect to a Ni concentration was measured in a B line cross section in the depth direction from the surface of the ground layer 21 to the dielectric layer 11. FIG. 5B illustrates a measured result of the Mo concentration in the B-line cross section. In FIG. 5B, a horizontal axis indicates a distance in the depth direction from the surface of the ground layer 21 to the dielectric layer 11. A vertical direction indicates a normalized value of the Mo concentration with respect to the Ni concentration. In concrete, the normalized values are normalized values (at %) on a presumption that a composition was analyzed at each measured point with use of the XPS, the Mo concentration was calculated with respect to the Ni concentration, and the Ni concentration at the end faces of the multilayer chip 10 was 1. It was confirmed that Mo existed near the surface of the ground layer 21. That is, Mo was detected on the surface of the ground layer 21, and Mo of detection limit or more was not detected in a part other than the surface in the depth direction from the surface of the ground layer 21 to the dielectric layer 11. That is, it was confirmed that Mo locally existed on the surface of the ground layer 21. Moreover, Mo was measured at an interval of 20 nm in the depth direction. However, Mo of the detection limit or more was detected only at the first measurement point. Therefore, it was confirmed that the local existence of Mo has a thickness of 20 nm or less in the depth direction.

With the manufacturing method in accordance with the embodiment, the interposing substance 25 including Mo is formed on the surface of the ground layer 21 on the side of the plated layers. In this case, when hydrogen is generated in the formation process of the Cu-plated layer 22, the Ni-plated layer 23 and the Sn-plated layer 24, the intrusion of the hydrogen into the internal electrode layer 12 is suppressed. Thus, the adsorption of the hydrogen in the internal electrode layer 12 is suppressed, and the reduction of the dielectric layer 11 is suppressed. Therefore, reduction of the insulating resistance is suppressed. And, when the interposing substance 25 including Mo is formed with a thickness of 20 nm or less, the reduction of the adhesion with respect to the plated layers formed on the ground layer 21 is suppressed.

The same effect may be achieved, when the Mo source is not added to the metal paste before forming the external electrode and a film of the Mo source is formed with a sputtering after coating the metal paste.

Example

The multilayer ceramic capacitors in accordance with the embodiment were made and the property was measured.

Example

Additive compound was added to barium titanate powder. The resulting barium titanate powder was sufficiently wet blended and was crushed. Thus, the dielectric material was obtained. An organic binder and a solvent were added to the dielectric material. And dielectric green sheets were made by a doctor blade method. A thickness of the dielectric green sheet was 0.8 μm. The organic binder was polyvinyl butyral (PVB) resin or the like. The solvent was ethanol, toluene or the like. And a plasticizer and so on were added. Next, the conductive paste for forming the internal electrode layer was made by mixing powder acting as a main component metal of the internal electrode layer 12, a binder, a solvent and an additive as needed. The organic binder and the solvent were different from those of the dielectric green sheet. The conductive paste was screen-printed on the dielectric sheet. 250 of the dielectric green sheets on which the conductive paste for forming the internal electrode layer were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size.

The binder was removed from the ceramic multilayer structure in N$_2$ atmosphere. After that, metal paste including a metal filler of which a main component is Ni, a co-material, a binder, solvent and a Mo source was coated from the both end faces of the ceramic multilayer structure to each side face and was dried. MoO$_3$ was used as the Mo source. In the example, MoO$_3$ wad added so that the concentration of MoO$_3$ with respect to the solid content of the metal paste was 0.1 wt %. After that, the metal paste was fired together with the ceramic multilayer structure for 10 minutes to two hours in a reductive atmosphere within a temperature range of 1100 degrees C. to 1300 degrees C., and a sintered structure was formed.

The length, the width and the height of the sintered structure were respectively 0.6 mm, 0.3 mm and 0.3 mm. The sintered structure was re-oxidized in N$_2$ atmosphere at 800 degrees C. After that, the Cu-plated layer 22, the Ni-plated layer 23 and the Sn-plated layer 24 were formed on the surface of the ground layer 21 by plating. And the multilayer ceramic capacitor 100 was fabricated. 100 samples of the example were made.

Comparative Example

In a comparative example, the Mo source was not added to the metal paste for the ground layer 21. Other conditions were the same as those of the example. 100 samples of the comparative example were manufactured.

The ground layer 21 and the Cu-plated layer 22 were observed with use of a STEM. In the example and the comparative example, it was confirmed that the interface 26 appeared between the ground layer 21 and the Cu-plated layer 22. Moreover, distribution of Mo was measured in the ground layer 21 and the Cu-plated layer 22 with use of a STEM-EDS. In the example, the interposing substance 25 including Mo was confirmed. In the comparative example, the interposing substance 25 was not confirmed.

A withstand test was performed with respect to the example and the comparative example. In the withstand test, a temperature was 85 degrees C., a relative humidity was 85%, an applied voltage was 10V, and a time was 100 h. In this case, an incidence rate of samples of which resistance was 100 MΩ or less for 60 seconds was measured. Table 1 shows results. As shown in Table 1, in the comparative example, the incidence rate becomes higher and was 18% or more. It is thought that this was because hydrogen permeated the external electrodes 20a and 20b was adsorbed in the internal electrode layer 12, and the dielectric layer 11 was reduced by the hydrogen. On the other hand, in the example, the incidence rate was largely reduced. It is thought that this was because the hydrogen permeation of the external electrodes 20a and 20b was suppressed because of formation of the interposing substance 25 on the surface of the ground layer 21 on the side of the Cu-plated layer, and the hydrogen adsorption into the internal electrode layer 12 was suppressed.

TABLE 1

|  | MoO$_3$ wt % | INCIDENCE RATE OF 85° C.-85%-10 V-100 h 60 s-100 MΩ |
|---|---|---|
| EXAMPLE | 0.1 | 2% |
| COMPARATIVE EXAMPLE | 0.0 | 18% |

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a multilayer chip having a parallelepiped shape in which each of a plurality of dielectric layers and each of a plurality of internal electrode layers are alternately stacked and each of the plurality of internal electrode layers is alternately exposed to two end faces of the multilayer chip, a main component of the plurality of dielectric layers being a ceramic; and
a pair of external electrodes that are formed on the two end faces;
wherein:
the pair of external electrodes have a structure in which a plated layer is formed on a ground layer;
a main component of the ground layer is Ni; and
the ground layer includes a glass component or a ceramic component and further includes molybdenum predominantly as molybdenum oxide, and at least a part of a surface of the ground layer on a side of the plated layer includes molybdenum oxide.

2. The multilayer ceramic capacitor as claimed in claim 1, wherein the plated layer includes a Sn-plated layer.

3. The multilayer ceramic capacitor as claimed in claim 1, wherein a main component metal of the ground layer is Ni.

4. The multilayer ceramic capacitor as claimed in claim 1, wherein a main component of the internal electrode layer is Ni.

5. The multilayer ceramic capacitor as claimed in claim 1, wherein the ceramic of the dielectric layer has a perovskite structure.

6. The multilayer ceramic capacitor as claimed in claim 1, wherein the ground layer includes the ceramic component, not the glass component.

\* \* \* \* \*